Patented May 19, 1942

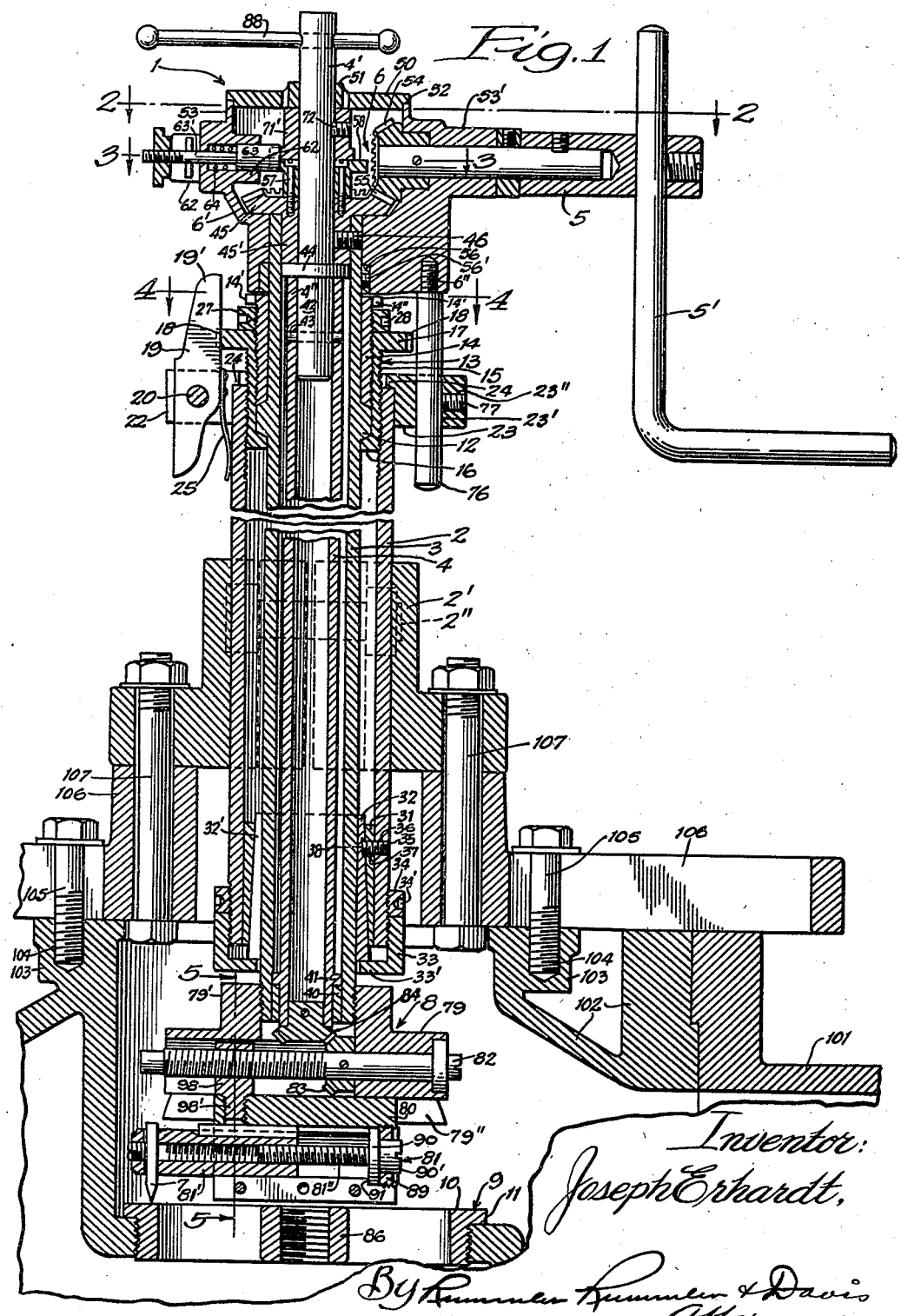

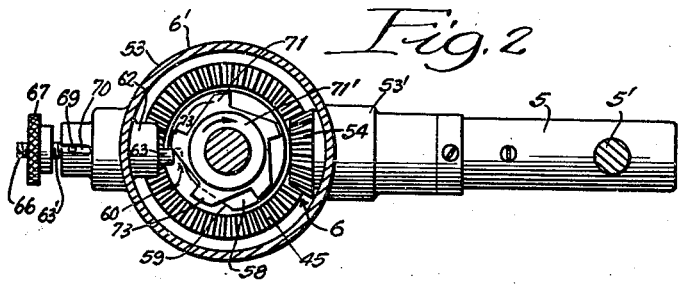
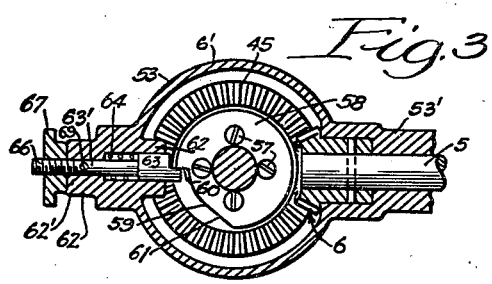
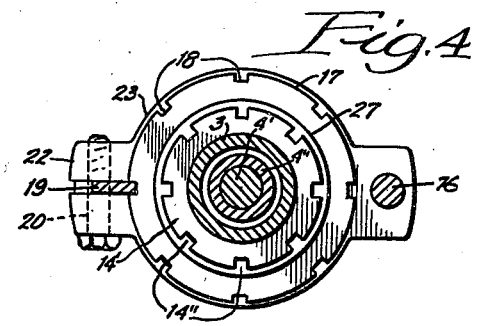
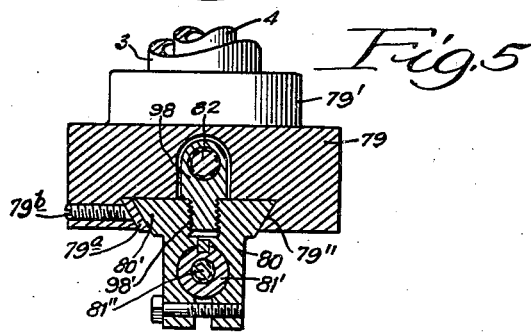
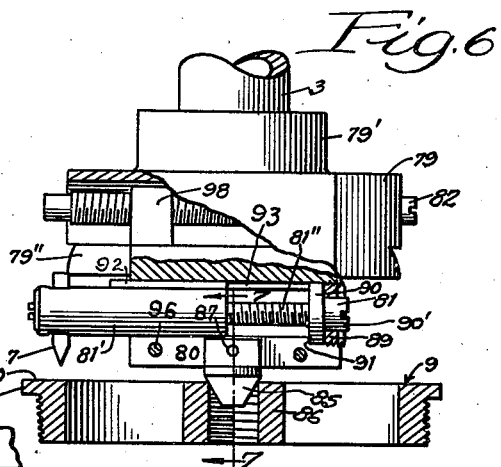
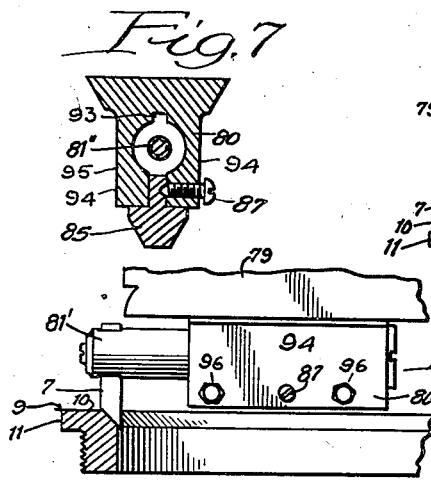
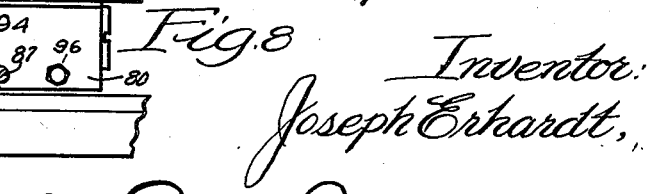

2,283,323

UNITED STATES PATENT OFFICE 2,283,323

APPARATUS FOR CUTTING VALVE SEATS

Joseph Erhardt, Chicago, Ill.

Application August 30, 1940, Serial No. 354,838

10 Claims. (Cl. 90—12.5)

This invention relates to means for carrying on cutting tool operations, as distinct from grinding, and more especially to valve seating apparatus and to machines for cutting and refinishing valve seats.

The main objects of the invention are to provide improved and more convenient means for finishing valve seats and for repairing such seats after wear; to provide a cutting device of this character adapted for application to a valve fitting in due relation to its seat for machining its face; to provide an improved and simplified system of adjusting and control means for such a machine; to minimize and simplify gearing and drive means; to provide for making a series of complete planar seat-face cuts each consisting of a series of concentric annular furrows or cuttings as distinct from a continuous spiral cutting; to provide such a device adapted either for hand or power operation and equipped with various adjustments to facilitate use under a wide range of conditions and according to various specific needs; and to provide a simple and inexpensive machine or tool of this kind adapted for ready use and maintenance by unskilled labor.

This invention is illustrated by the accompanying drawings in which:

Figure 1 is substantially a longitudinal axial section through the machine as a whole, together with a typical valve fitting and seat to be operated upon, in this instance a pump valve.

Fig. 2 is partly a top plan of the apparatus and includes a section on the line 2—2 of Fig. 1, showing a somewhat star-shaped ratchetlike step-by-step control for causing tool feed horizontally.

Fig. 3 is mainly a section taken on the line 3—3 of Fig. 1, and shows a cam-operated pawl to actuate the "star-ratchet" of Fig. 2.

Fig. 4 is mainly a section taken on the line 4—4 of Fig. 1.

Fig. 5 is mainly a section taken on the line 5—5 of Fig. 1.

Fig. 6 is a fragmentary view of the lower part of the machine (see Fig. 1), partly in axial section and shows the work and machine centering attachment as it is used in applying the machine to a piece of work, as for instance, to a pump valve.

Fig. 7 is a section on the line 7—7 of Fig. 6.

Fig. 8 is mainly a side elevation of the cutting tool holder; and it illustrates the use of a tool for cutting conoidal valve seats, in which case the cutter is advanced very slowly.

Referring further to Fig. 1, the machine or tool 1 as a whole comprises mainly an elongated hollow frame 2, a pair of concentric relatively movable drive shafts 3 and 4 housed therein, a supporting clamp 2' for frame 2, cutting means to be described, and power applying means including a crank shaft 5 and gearing 6, said shaft being adapted to receive a hand crank 5'. Tool 1 also includes a shell or head 6' to receive said shaft 5 and to house gearing 6. Said cutting means includes a machine tool or cutter 7 with connective control and power transmitting means 8 therefor at the lower end of shafts 3 and 4 and carried thereby. Also there are certain adjustment and further control means arranged and mounted as will be pointed out.

Frame mounting

The said frame 2 is readily mountable for vertical adjustment by its friction slide clamp 2' and bolts 2'', said clamp being mountable, as will be explained, on any appropriate valve fitting or body 9 having a bearing face or seat 10 to be refinished or cut. The said seat may well be and usually is formed on a renewable threaded seat ring 11, depending upon the kind of valve to be treated.

Main power shafts and their mounting

I will now describe the relation of shafts 3 and 4 both as to mounting and functions respectively. The relatively short outer shaft 3 has an outward bearing or flange 12 somewhat above its center whereby this shaft is fixed lengthwise relative to an up-and-down carrier 13 which is screw mounted in the upper end of tubular frame 2. This carrier comprises a pair of concentric sleeves 14 and 15, the inner of which 14 fits snugly on shaft 3 and abuts downwardly against said flange 12. The outer sleeve 15 has an inward flange 16 to bear upwardly against said flange 12 and an outward flange 17 having a series of notches 18 to receive a locking latch 19, as will be explained.

The said latch is disposed vertically and is carried on a horizontal pivot bolt 20 set in a split radial arm 22 of a ring 23 which rigidly embraces and rests by its inward flange 24 on the top of frame 2, about opposite flange 12 and somewhat below flange 17. The long upper arm 19' of latch 19 is urged by a spring 25 on said latch to engage the flange notches 18 and so to secure the current adjustments of screw sleeve 15, up and down relative to frame 2. When the sleeve 14 is screwed down in sleeve 15 to engage flange 12 tightly, it is locked there by means of the ring 27 having wrench engagement apertures 28. Said sleeve 14 has a flange 14' with notches 14" to receive a turning wrench, not shown.

Normally the combined clamping bolt and pivot 20 are set tightly, as when the tool is in operation. In case it should be desired to swing the top shell or gear housing 6' one way or the other, so as to bring the shaft 5 and crank 5' to a more convenient position, the bolt 20 may be loosened so as to permit rotation of said gear housing 6' accordingly relative to frame tube 2.

The said shafts 3 and 4 normally rotate as a unit, the inner shaft 4 at its ends being snugly embraced and carried by the gear driven outer shaft 3. The lower end part of this shaft combination (3—4) is centered in frame 2 and so held by means of the oppositely flared concentric rings or sleeves 31 and 32, the one being fixed in the frame 2 and the other (32) being split at 32' and fitted slidably between sleeve 31 and shaft 3 where it is upwardly adjustable wedgingly by means of screw sleeve 33 on frame 2 below the clamping support 2', said sleeve 33 having an inward flange 33' bearing upward against said split sleeve 32. Said sleeve 33 is locked in place by the threaded ring 34 having wrench control apertures 34'. The sleeves 31 and 32 are held against turning by the screw 35 occupying holes 36 and 37 in tube 2 and sleeve 31 and slot 38 in sleeve 32.

The inner shaft 4 is locked against downward movement by a ring 40 set in the lower part of shaft 3 and bearing upward against flange 41 on shaft 4.

This inner shaft 4 comprises a solid upper end part 4' set in the main tubular lower part 4", the latter overlapping at 42 where said parts are fastened together by a crosspin 43. Upward movement of shaft 4 is prevented by its abutment against the ring or collar 44 carried rigidly on said extension 4' which collar bears upward against the gear hub 45' of gear 45, which hub is locked by set screw 46 on shaft 3.

*Top head and upper gearing*

The hollow head 6' has a removable top closure 50 formed with a hub 51 to receive the upper end of the inner shaft part 4'. Closure 50 seats snugly at 52 on the main head-casing part 53 on the side of which the horizontal shaft 5 is journalled in hub 53'. Said head 6' also houses the gear 54, which is fixed on the inner end of said shaft 5 and which engages gear 45 bevelwise at 55. Ring 56 is set by a screw 56' engaging shaft 3; and it supports head 6' through casing part 53.

Secured by screws 57 to the top of gear 45 is a cam wheel 58, the outer face of which is cylindrical except for the indentation at 59 where there is a radial shoulder 60, leading down to the foot of which in the direction of rotation there is an inclined cam face 61. This inclined face extends about ninety degrees, as best shown in Fig. 3.

On the opposite side of casing part 53 from shaft 5 and gear 54 is a chambered hub 62 containing a plunger type of pawl 63. This pawl is urged inwardly by a spring 64 to ride upon said cam wheel 58 and thus be actuated thereby. The outer part of pawl 63 is spindlelike; and the stem 63' is guided by the perforated outer part 62' of hub 62. The tip of stem 63' is threaded at 66 for pawl throw adjustment, which is by manual turning of the knurled nut 67. Said pawl is held from rotation by a pintle 69 set crosswise in its stem, the ends of which pintle ride in a guide slot 70 in hub part 62'. This pawl 63 may be held retracted by pulling it out and turning it manually about ninety degrees so as to rest crosswise on the outer end of hub part 62'.

*Star ratchet and radial feed control*

Facing downwardly on cam wheel 58 is a five-point star member or ratchet wheel 71 having an upward hub 71' fixed by a set screw 72 on shaft 4'. Whenever, as in cutting operation, the driving shaft 3 turns (clockwise) to a point where the pawl 63 moves into the cam recess 59, said pawl will catch an arm 73 of star wheel 71 and thereby arrest said wheel with its shaft 4'. The resulting reverse turning of shaft 4' relative to shaft 3 will rotate the gears at the foot of shaft 4 to advance the cutter 7 horizontally outward as will be explained.

Turning of the top gear casing 6', relative to the rigidly held ring 23 fixed on frame tube 2, is prevented by a vertical side rod 76 which is screwed upwardly into said casing 6' at 6" and is slidable downwardly into the perforation 23' in arm 23" of ring 23, where it may be secured by set screw 77.

*Tool carriage and its control*

Referring now to Figs. 5, 6, 7 and 8, the immediate support and control of the cutter 7 shown at the lower left corner of Fig. 1 will next be described.

The power transmitting and control means 8 above referred to includes the rotary head 79 having a hub 79' which is screwed rigidly onto the lower tip of main drive shaft 3 (see Figs. 5 and 6). This head 79 is deeply cross grooved on its underside at 79" (see Fig. 5) to receive a radial feed slide carriage 80 for the tool 7 and its lateral fine adjustment means 81. This means includes slide 81' and screw 81". Head 79 also contains a horizontal feed shaft 82, bevel gear 83 set thereon, and bevel gear 84 set on the lower end of shaft 4 (see Fig. 1.)

Referring to Fig. 5 it is to be noted that the carriage 80 has upwardly inclined bearing sides 80'. On one side of groove 79" is a spacing wear plate 79a with a pair of set-screws 79b therefor in head 79. The threaded collar 98 for shaft 82 has a downward threaded stem 98' to engage rigidly the main body part of carriage 80.

*Centering means*

On the lower side of carriage 80 is attachable a centering plug 85 to seat temporarily in the valve stem guide 86 of the valve frame. It is held by the screw 87, as shown by Figs. 6 and 7.

When the machine has been centered the plug 85 is removed and the cutter 7 is adjusted with its cutting tip adjacent to the inner top edge of the valve seat ready for the first horizontal face cut.

*Adjustment for cutting*

This adjustment may be accomplished by retracting carriage 80, to the right in Fig. 1, as by turning the shaft 4—4' clockwise by handle 88; then lowering shaft 3, as by means of turning sleeve 15 clockwise, and then giving precise horizontal adjustment of slide 81' by turning screw 81", and finally, if necessary, lowering the cutter 7 somewhat more by further turning sleeve 15 clockwise and so lowering carrier 13 to the exact desired cut level.

The fine-adjustment screw 81" in carriage 80 is held longitudinally by a threaded stop ring 89, which screw has a flange 90 on the inner end of its head 90'. This flange 90 bears inwardly against the carrier shoulder 91 and outwardly against said stop ring 89.

Slide 81' is cylindrical and has a key 92 fitting in the way 93 on carrier 80. This slide is held snugly by screws 96 which clamp the downward sides 94 of the split housing shell 95, on the lower edge of carriage 80, inwardly against the slide 81' and so hold it slidably in carriage 80, subject to screw 81'' for endwise adjustment. Rotation of slide 81' is prevented by key 92.

In operation, upon turning the crank 5' clockwise the shafts 3 and 4 will turn together for about 270° carrying the cutter 7 accordingly in cutting relation to the work 10. Then for about 90° due to cam 58 the pawl 63 will hold back the star ratchet 71 and with it shaft 4. This will cause the gear 84 fixed on the lower end of shaft 4 to rotate clockwise the coacting gear 83 on feed shaft 82 and thus gradually advance, step-by-step, the collar 98 radially and with it carriage 80 and tool 7.

Hence, as the work progresses, and the handle 5' is turned clockwise the shaft combination 3—4 is turned likewise. Periodically the pawl 63 momentarily withholds shaft 4 and gives it counterclockwise motion relative to shaft 3 and so, through gears 83 and 84 and shaft 82, advances members 80 and 81' with tool 7 step-by-step outwardly across the valve seat.

*Method of use summarized*

When a valve seat is to be recut or corrected the frame surrounding it is removed and the tool as a whole is applied. Referring to the drawings, the water main or pipe 101 has a valve fitting 102 provided with the valve ring 11, and a pump base 103 having tapped holes 104 to receive bolts 105 for securing the tool base 106. When this base 106 is fixed in place the tool frame 2 is centered relative to the work, and is fixed in position between the clamp parts 2'; and the bolts 2'' and 107 are tightened.

The cutter 7 is then brought to its inward starting point by pulling it in centrally with hand rotation of shaft 4' and by lowering it with carrier 13. Its exact height position is determined by the gauge notches 18 on flange 17.

Then, by turning crank 5' the first cut is made. Whereupon the tool is retracted toward the center by turning handle 88 clockwise. It is then lowered slightly by carrier 13 for the next cut; and so until the job is finished.

The tool 1 as a whole is then removed and the pump or valve parts restored to their normal positions.

*Regarding conical seats*

Referring to Fig. 8, when the seat ring is to be cut for a conical valve, the tool 7 is adjusted horizontally and there held. Then it is fed downwardly by turning the sleeve 15 step-by-step according to the notches 18 on its flange 17, as the head 79 rotates. During this simple downward cutting the star ratchet is held out of gear by securing the pawl 63 in its retracted position, with the pin 69 set crosswise on the hub part 62' over the slot 70.

It is to be understood that some of the details set forth may be altered or omitted without departing from the spirit of the invention as defined by the following claims.

I claim:

1. In a device of the class described a supporting frame member of tubular design and having interior threads at one end, in combination with a pair of independently rotatable concentric shafts housed therein and projecting from the ends thereof, a cutting-tool and gear-carrying head mounted on one end of said shafts and power applying means and control gearing secured operatively to and carried by the said shafts at their opposite end and an exteriorly threaded sleeve affixed to and supporting said shafts and fitting in the corresponding threaded end of said frame member to adjust the position of said shafts axially of said frame member.

2. In a work-machining device of the class described, a frame in combination with a pair of concentric shafts with a machine tool carrying head secured to one end of said shafts and means for supplying and distributing rotative power and effect to one of said shafts continuously and to the other intermittently, said head having gear and screw means operatively connected to the intermittently rotatable shaft for step-by-step advancement of the tool across the face of the work.

3. A device of the class described comprising a frame having a pair of concentric shafts the inner carried frictionally by the latter and both mounted rotatably in said frame and with a cutting tool at one end and with drive gearing at the opposite end, said gearing including means to drive the outer shaft positively and continuously and there being means to arrest the inner shaft intermittently, the latter means comprising a frame-supported radially mounted pawl, a cam carried by the outer shaft to control said pawl and the inner shaft having a ratchet fixed thereon adapted to be engaged periodically by said pawl to arrest the inner shaft.

4. A tool of the class described comprising an elongated tubular frame having a cutter at one end and means to apply power at the opposite frame end, a pair of concentric shafts, the outer to support and to transmit power to said cutter, the outer shaft having a radially disposed arm carried rotatively thereon on which arm the cutter is mounted for outward radial feed, and the inner shaft having gear and screw means to advance the cutter on said arm, a radially operated pawl by which said shafts are mechanically connected at their power receiving end, the outer shaft having a cam to actuate the pawl and the inner shaft having a series of ratchet teeth whereby the inner shaft is arrested periodically by said pawl.

5. In a device of the class described, an elongated frame having a pair of concentric shafts with a power-receiving head at one end and a tool-control head at the opposite end, the power-receiving head being fixed on said frame and containing a gear fixed on the outer of said shafts to power the latter, said power-receiving head also having radially disposed therein a pawl with means to urge it inwardly, a cam on said gear to operate said pawl once for each revolution of said gear and outer shaft, a toothed ratchet fixed on said inner shaft to receive a part of said pawl whenever the latter moves inwardly whereby the inner shaft is momentarily arrested periodically, said tool-control head comprising a radial arm with a cutter thereon, and means to advance said arm and cutter comprising a carriage for said arm slidably mounted on the lower end of said outer shaft and turnable therewith, a screw to move said carriage, and a pair of bevel gears on said screw and inner shaft to actuate said screw and carriage whenever the rotation of said inner shaft is momentarily arrested by said pawl during use of the tool.

6. As an article of manufacture, a valve dressing tool comprising an elongated hollow frame, a support for said frame rigidly attachable to the valve fitting and having means to grip said frame for slidable adjustment of the latter in alignment with the valve seat to be treated, duplex shaft means within said frame, one part carried by and within the other part, means to rotate the outer said part in a substantially continuous and even manner, a combination cam-pawl-and-ratchet means to arrest the inner said part at definite intervals, a machine-cutter carrying-arm disposed crosswise slidably on the lower end of the outer part, combination gear-and-screw means actuated periodically by said inner part to advance said arm and its cutter radially step-by-step, and manual means to feed the said duplex shaft means downwardly step-by-step.

7. As an article of manufacture, a valve seat dressing tool comprising a hollow frame, a support for said frame mountable in due relation to the valve seat to be treated, duplex shaft means within said frame, one part carried by and within the other part, means to rotate the outer said part in a substantially continuous and even manner, a combination cam-pawl-and-ratchet means to arrest the inner said part at definite intervals, a machine-cutter carrying-arm disposed crosswise slidably on the lower end of the outer said shaft part, means actuated periodically by said inner shaft part to advance said arm and its cutter radially step-by-step, and manual step-by-step means to feed the said duplex shaft means downwardly, the cam of said arresting means being fixed on the outer shaft part, the pawl being adjustably mounted on a nonrotatable part of the tool for more-or-less radial inward thrust according to adjustment and said ratchet being fixed on the inner shaft part and having a series of radial teeth engageable for a greater-or-less time by a part of said pawl according to pawl adjustment to determine the radial extent of each annular cut.

8. In a device of the class described, a step-by-step drive mechanism comprising a positively driven hollow shaft in combination with an inner shaft carried thereby, a cam wheel and a ratchet wheel mounted coaxially the one beneath the other, and a radially operative pawl the inward tip of which is disposed partly opposite the outward faces respectively of said cam and ratchet wheels, the said cam wheel being affixed to one of said shafts and the ratchet wheel to the other of said shafts, whereby in operation the ratchet supporting shaft will be retarded periodically.

9. In a device of the class described, a step-by-step drive mechanism comprising a positively driven shaft in combination with another shaft in friction drive relation thereto, a cam and a ratchet proximately mounted coaxially, and a stationary pawl the inward tip of which is disposed partly opposite the outward faces respectively of said cam and said ratchet, the said cam being positively operated by said driven shaft and the ratchet having positive turning relation to the other of said shafts, whereby in operation the ratchet affected shaft will be retarded periodically under cam and pawl control.

10. In a step-by-step-feed cutter device of the class described a pair of vertical concentric shafts, a head fixed on the lower end of the outer shaft, an elongated carriage movably radially on said head and having a cutter on its outer end, a rotary screw longitudinally fixed on said head to control the position of said carriage radially, means to rotate the outer of said shafts uniformly, means to cause regular intermittent rotation of the inner of said shafts and gearing whereby said screw and inner shaft are connected for intermittent radial feed of said cutter.

JOSEPH ERHARDT.